Nov. 23, 1954     F. E. BROWN     2,695,023
HYPODERMIC SYRINGE

Filed Jan. 4, 1952     3 Sheets-Sheet 1

FRANK E. BROWN,
INVENTOR.

BY *Lyon & Lyon*
ATTORNEYS

Nov. 23, 1954

F. E. BROWN 2,695,023

HYPODERMIC SYRINGE

Filed Jan. 4, 1952

FRANK E. BROWN,
INVENTOR.

BY Lyon & Lyon

ATTORNEYS

Nov. 23, 1954     F. E. BROWN     2,695,023
HYPODERMIC SYRINGE
Filed Jan. 4, 1952     3 Sheets-Sheet 3
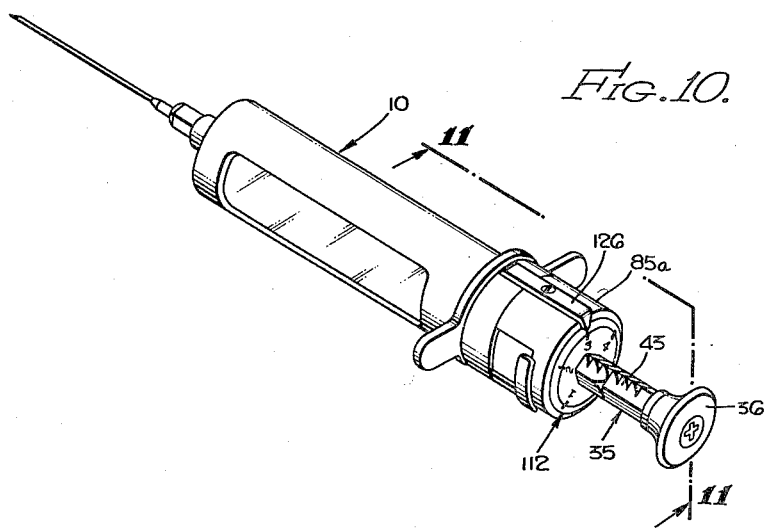
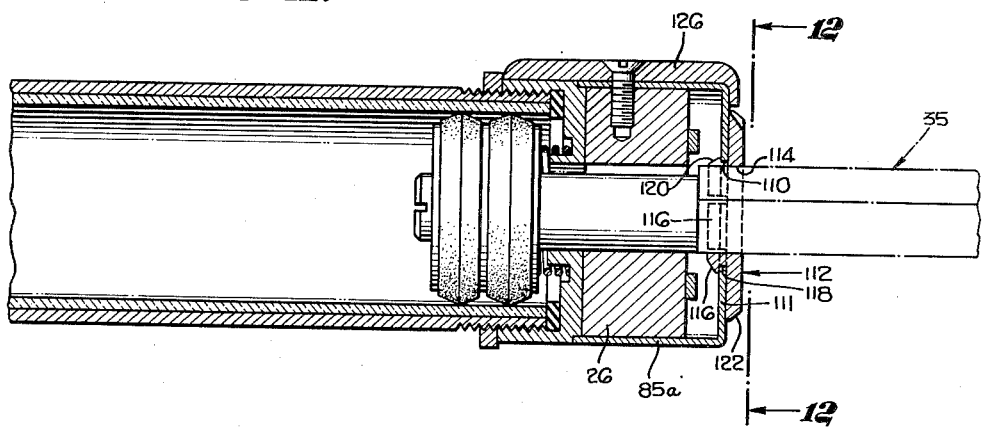
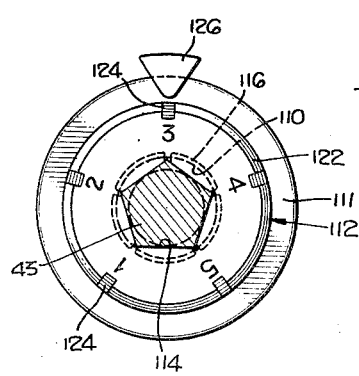
FRANK E. BROWN,
INVENTOR.
BY
ATTORNEYS

United States Patent Office 2,695,023
Patented Nov. 23, 1954

2,695,023

HYPODERMIC SYRINGE

Frank E. Brown, Burbank, Calif., assignor, by mesne assignments, to Chas. Pfizer & Co., Inc., Brooklyn, N. Y., a corporation of Delaware Application January 4, 1952, Serial No. 264,991

13 Claims. (Cl. 128—218)

This invention is a continuation-in-part of my co-pending application for United States Letters Patent for a "Hypodermic Syringe," filed October 5, 1951, and bearing Serial No. 249,959, now abandoned. This invention relates to hypodermic syringes and has particular reference to an improved syringe of the multiple-dose type.

Multiple-dose syringes, that is, syringes which are adapted to deliver repeated or successive doses without refilling, are used extensively in the treatment of livestock and other animals, especially where it is necessary to treat or inoculate a relatively large number of animals with the same serum or other medication. The commercially available devices of this type are subject to various disadvantages, however. For example, some types require auxiliary supply reservoirs and supply tubes and are therefore cumbersome to operate. Others require manual setting of the dosage before each injection and are therefore subject to inaccuracies due to the personal error of the operator. Still other designs are limited in the selection of the dosage quantity and additionally require disassembly of the unit in order to change the dosage quantity. Accordingly, one of the principal objects of this invention is to provide a multiple-dose syringe which does not possess these various disadvantages.

More specifically, one of the principal objects of this invention is to provide a multiple-dose hypodermic syringe which is extremely simple in design and in operation, yet which is highly effective and adapted to deliver successive doses with a high degree of accuracy.

Another object of this invention is to provide a multiple-dose hpyodermic syringe which is adapted to deliver a large number of successive doses in a large number of varying quantities, the quantities extending over a wide range.

Another object of this invention is to provide a multiple-dose hypodermic syringe which is provided with a wide range of dose quantity settings, and which is provided with means whereby the desired setting or settings may be quickly and easily made without disassembly of any part thereof.

Another object of this invention is to provide a multiple-dose hypodermic syringe in which the novel structure thereof is adapted to be incorporated in a conventional syringe of the single-shot type.

Yet another object of this invention is to provide a multiple-dose hypodermic syringe which is provided with a single-motion touch plate control for successive dosage application, and wherein the same touch plate control is arranged to permit single-shot, full capacity injections if desired.

Other objects and advantages of this invention it is believed will be readily apparent from the following detailed description of preferred embodiments thereof when read in connection with the accompanying drawings.

In the drawings:

Figure 10 is a perspective view illustrating a further modified form of the invention.

Figure 11 is a sectional view taken substantially on the line 11—11 of Figure 10.

Figure 12 is a sectional view taken substantially on the line 12—12 of Figure 11.

Figure 1:
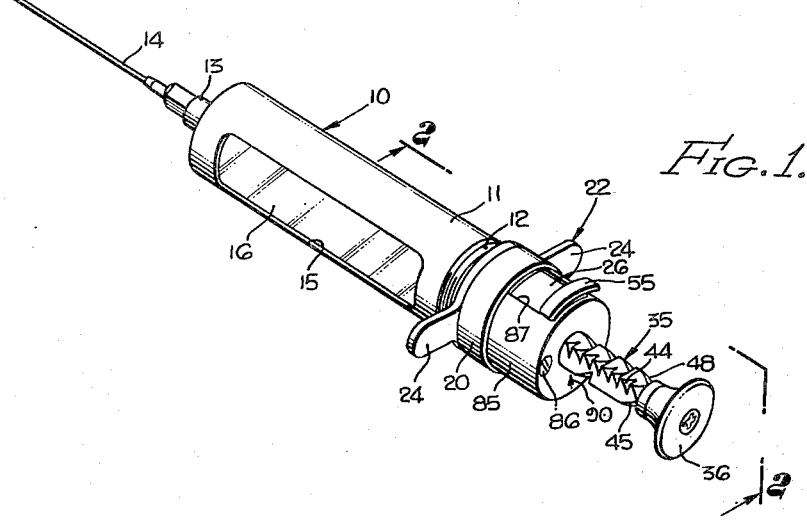
Figure 1 is a perspective view of a hypodermic syringe embodying the invention.

Referring now to the drawings, the hypodermic syringe device which forms a preferred embodiment of the invention is generally indicated 10 and includes a conventional barrel casing 11 having a threaded open end 12 and provided at the other end with a needle socket member 13 adapted to releasably retain a conventional hypodermic needle 14. The casing 11 is provided with sight openings 15, and visible therethrough is the cylindrical barrel or medication reservoir 16 which is preferably of glass or other transparent material.

A flange member 20 is threadedly engaged with the end 12 of the barrel casing and maintains the barrel 16 in position, a gasket 21 being interposed therebetween to prevent leakage of fluid from the barrel. While relatively fine threads are shown for connecting the flange member 20 to the barrel casing 11, coarse threads may be provided so that the flange member and its associated parts may be easily removed from the casing with only a single turn. A nut member 22 is also threaded on the end 12 and is tightened against the flange member 20 to lock it in the desired position. The nut member is provided with wing elements 24 functioning as finger rest members, as will be pointed out in more detail below.

Figure 6:
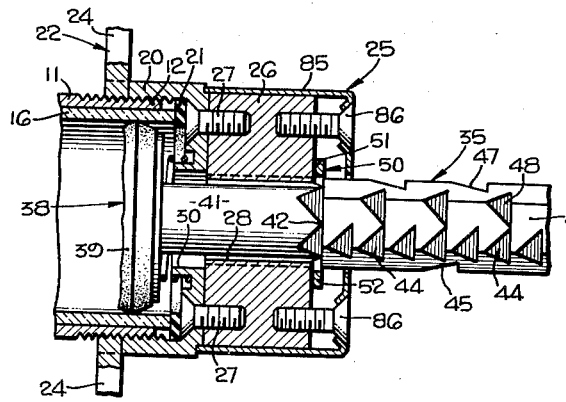
Figure 6 is a sectional view taken substantially on the line 6—6 of Figure 2.

Carried on the end of the flange member 20 is the dosage control and selector assembly 25 which includes a disk-shaped base member 26. The base member is secured to the flange member by means of screw elements 27 (Figure 6) and is provided with a non-circular central opening 28, preferably pentagonal, as shown. Extending through the opening 28 and the central opening 30 in the flange member is a plunger or selector rod 35 to the exterior end of which is secured a flanged hand rest 36 and to the other end of which is secured, by means of threaded member 37, a conventional expandable plunger 38. The plunger consists of a pair of resilient disks 39 spaced by means of a washer 40, the effective diameter of the disks being varied by appropriate tightening or loosening of the threaded member 37 so that the disks may be brought into sealing contact with the walls of the barrel 16 for operation or may be decreased in diameter for disassembly.

The inner end portion of the plunger rod 35 is provided with a cylindrical periphery 41 extending to a break line 42, the diameter of the cylinder being such as to form a snug fit with the flat surfaces of the pentagonal central opening 28. The remainder of the rod, or that portion 43 which extends outwardly from the break line, is generally pentagonal in cross-section and adapted to form a smooth running fit with the pentagonal opening 28. Formed in each of the five edges of the pentagonal portion 43 is a series of abutment means or notches 44, 45, 46, 47 and 48, each series of notches differing from the others only in the spacing of the notches of each series. As will be more fully explained below, the notches of each series are provided with radial rear faces and are uniformly spaced to provide stop portions for the attainment of a succession of doses of uniform quantity.

Locking means are provided for cooperation with the notched selector rod 35, and as shown in the drawings these means may include the lock member 50 which is operably connected to the base member 26. The lock member includes a generally U-shaped plate having a pair of legs 51 and 52 connected together by means of a relatively wide latch portion or member 53 having a bevelled rod-contacting edge 54. The legs extend transversely outwardly from the base member 26 and are closed by means of a curved touch plate 55 connected thereto.

Figure 4:
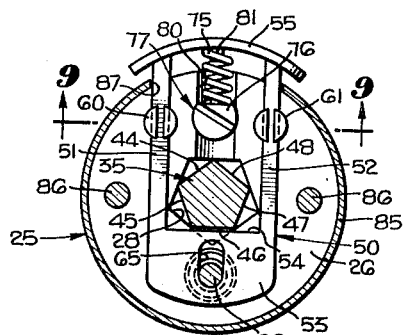
Figure 4 is a sectional view taken substantially on the line 4—4 of Figure 2.
Figure 5:
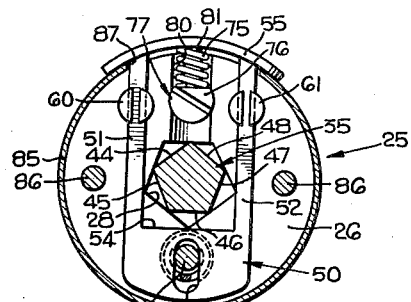
Figure 5 is a sectional view taken substantially on the line 5—5 of Figure 3.
Figure 9:
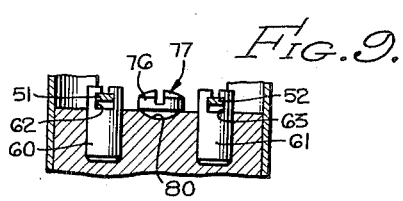
Figure 9 is a sectional view taken substantially on the line 9—9 of Figure 4.

Means are provided for slidably securing the lock member to the base member for transverse movement with respect to the base member and selector rod, and as shown in the drawings, particularly Figures 4, 5 and 9, these means include the post members 60 and 61 which are provided with transverse channels 62 and 63 for the reception of the legs 51 and 52 respectively. Additionally, the latch portion 53 is provided with an elongated opening 65 through which extends a pin 66 which is force-fitted in a bore 67 in the base member 26. The pin is provided with a flattened head 68 to limit longitudinal movement of the lock member. Resilient means for normally urging the latch member longitudinally of the abutment notches are provided adjacent the lock member in the form of a helical spring 70 in a counter bore 71. The spring is under compression, normally tending to force the latch portion 53 in a direction away from the end of the base member. Means also are provided for normally urging the lock member in a direction to cause the edge 54 of the latch portion to remain in contact with the selector rod 35, and as shown these means may include the helical spring 75 interposed, under compression. between the touch plate 55 and the flattened head 76 of a screw member 77 which is secured to the base member 26. The base member is provided with a shallow curved groove 80 to accommodate a portion of the spring 75 which encircles a pin 81, one end of the pin being secured to the central portion of the touch plate and the other end thereof being slidably received in a transverse bore (not shown) in the screw head 76.

The lock mechanism described above is enclosed in a cup-shaped cover member 85 which is secured to the base member 26 by means of the screw elements 86. The cover member is provided with a longitudinal slot 87 providing clearance for the lock member when the device is being assembled and disassembled.

Figure 2:
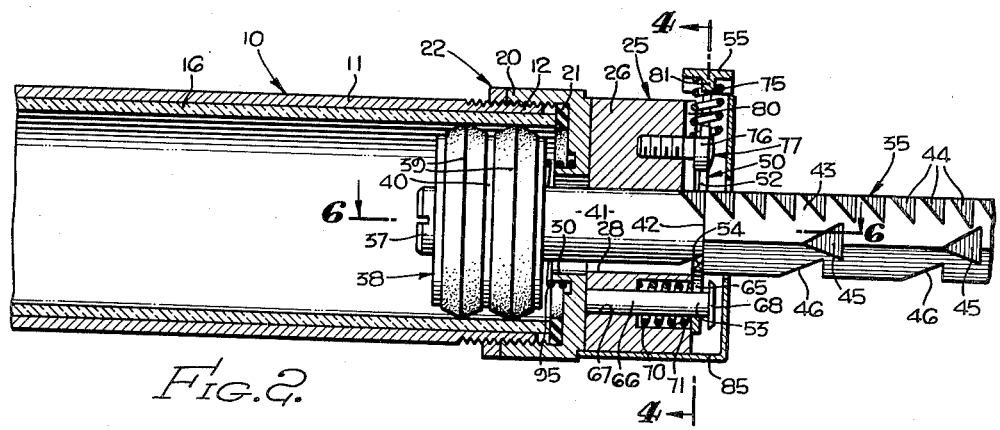
Figure 2 is a sectional view taken substantially on the line 2—2 of Figure 1.
Figure 3:
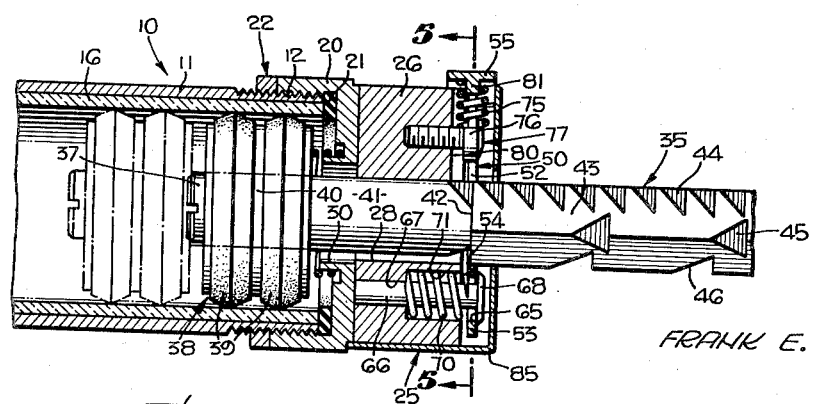
Figure 3 is a sectional view similar to Figure 2 but illustrating the device in position for application of a single dose.

In operation, the barrel 16 is first filled with the desired medication, with the plunger 38 completely retracted as shown in Figure 2. As shown in Figures 2 and 4, the plunger rod 35 is locked against forward longitudinal movement by means of the latch portion 53 which is engaged in the most forward notch 46, the spring 75 urging the edge 54 radially inwardly and maintaining it in engagement against the radial rear face of the notch. In order to set the device for the first dose, the touch plate 55 is depressed, moving the latch portion of the lock member transversely or radially outwardly until the edge 54 is moved completely out of the notch. The spring 70 then causes the lock member or the latch portion thereof to move longitudinally rearwardly to the position shown in Figures 3 and 5 wherein the edge 54 rests against the peripheral edge of the rod 35. This occurs with a pronounced "click" which is both heard and felt by the operator to apprise him that the device is set for the delivery of a dose. It will thus be apparent that this latter resilient means 70 is adapted to overrule the first resilient means, 75, upon disengagement of the latch from the abutment edge of the notch to ready the device for an injection operation. It also will be noted that this action prevents the latch from reentering or immediately reengaging the notch once it has been disengaged therefrom. The plunger may then be advanced in the usual manner by grasping the finger rests 24 and pushing on the hand rest 36 with the thumb or heel of the hand. The plunger 38 and rod 35 are thus advanced forwardly, ejecting a dose of medication from the barrel 16 and through the needle 14, until the next notch 46 is brought into position adjacent the latch member 53. The spring 75 then causes the edge 54 to enter into the notch. Upon continued advance of the plunger rod the rear face of the latch member contacts the radial rear face of the notch whereupon the plunger rod forces the latch member forwardly, compressing the spring 70, until the front face of the latch member abuts against the base member 26. A predetermined dose of medication has thus been delivered from the syringe. A second and succeeding doses are delivered in the same manner.

From the above description it will be understood that the dosage quantity, for a given barrel diameter, is governed by the spacing of the notches on the plunger rod. Accordingly, by virtue of the pentagonal plunger rod with its five series of notches, five separate dosage quantities are provided, and by way of example the notches 44, 45, 46, 47 and 48 may be so spaced as to provide dosages of 1 cc., 2 cc., 3 cc., 4 cc. and 5 cc. respectively. It will be understood that other dosage quantities may be provided by appropriate spacing of the notches. It is to be further understood that while a pentagonal plunger rod and opening 28 have been shown and described, other shapes may of course be used, and the number of series of notches varied accordingly.

In order to change dosage quantities, the plunger rod is pulled rearwardly to the limit of its travel so that only the cylindrical portion 41 thereof is contained in the central opening 28. The rod may then be axially rotated until the desired series of notches is brought in alignment with the indexing marks 90 on the cover member 85, which mark is aligned with the edge 54 of the latch member. The plunger rod is then advanced slightly to the position shown in Figure 2, where a sufficient portion of the pentagonal portion 43 is engaged in the pentagonal opening 28 to prevent rotation of the plunger rod. In order to assist this operation and to assure quick line-up of the rod and opening, a helical spring member 95 is provided, connected to the flange member 20 and interposed between the forward end of the flange member and the rear face of the plunger 38. This spring is put under compression when the plunger rod is fully withdrawn for selecting a changed dosage and hence tends to urge the plunger and plunger rod forwardly. Accordingly, when the rod is rotated to the desired position with the pentagonal portion 43 thereof aligned with the pentagonal opening 28, the spring urges the plunger rod forwardly into engagement with the opening, thus eliminating the necessity of undue searching by the operator for the proper position. Additionally, the increased force required to withdraw the plunger rod for setting, which increased force is due to the tension of the spring, provides an indication to the operator that he has withdrawn the plunger rod sufficiently far to clear the pentagonal portion 43 from the opening 28.

The device 10 may be used in the manner of a conventional syringe to inject the entire contents of the barrel merely by depressing the touch plate and holding it thus so that the plunger rod is free to be completely advanced in a single uninterrupted stroke.

Figure 7:
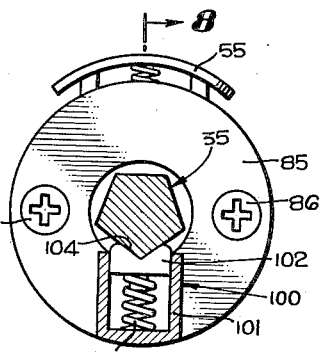
Figure 7 is an end view, partly in section, of a modified form of quantity indexing device.
Figure 8:
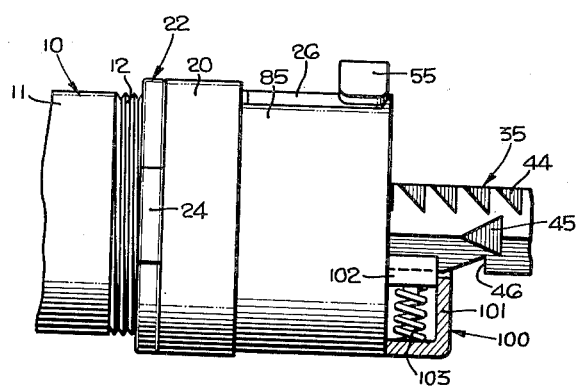
Figure 8 is a sectional view taken substantially on the line 8—8 of Figure 7.

A modified form of dosage indexing means is shown in Figures 7 and 8. Here the indexing mark 90 is substituted with the indexing assembly generally indicated 100. This consists of a casing 101 secured to the rear face of the cover member 85, which casing contains a radially slidable saddle member 102. A helical spring 103 urges the saddle member inwardly so that the grooved face 104 thereof contacts the plunger rod 35 and co-operates with the appropriate edge of the rod to properly align the pentagonal portion 43 of the rod with the pentagonal opening 28. It will be understood that with the device in the aligned position shown in Figures 7 and 8, the spring exerts a minimum of force against the saddle so that upon rotation of the plunger rod the tendency is for the saddle to click into place as each of the rod edges is passed thereagainst.

A further modified form of dosage indexing means is illustrated in Figures 10, 11 and 12. The cover member 85a is provided with a circular central opening 110 in the rear face 111 thereof. An indexing or selector dial generally indicated 112 is mounted for axial rotation on the rear face 111 and is provided with a central pentagonal opening 114, only slightly larger in cross-section than the portion 43 of the plunger rod 35 so that the dial 112 is constrained to rotate with the plunger rod, but the plunger rod is freely slidable longitudinally with respect to the dial. The dial 112 is provided with a plurality of forwardly directed spring fingers 116 which extend through the opening 110, the fingers being undercut as at 118 to prevent disassembly of the dial from the cover member 85a. As shown the spring fingers 116 are provided with bevelled end surfaces 120 which permit the dial 112 to be attached to the cover member 85a by insertion of the fingers 116 in a forward direction through the opening 110.

The periphery of the dial 112 is provided with a bevelled surface 122 and imprinted thereon are index marks 124, each one of which is radial with one of the corners of the pentagonal opening 114, and hence also aligned with one of the five edges of the pentagonal portion 43 of the plunger rod. The index marks 124 are provided with appropriate numerals indicating the respective dosage volumes. Cooperating with the selector dial is an indicator finger 126 which is rigidly secured to the cover member 85a. From the above description it will be understood that the desired dosage is obtained merely by withdrawing the plunger rod to the limit of its travel so that only the cylindrical portion 41 thereof is contained in the central opening 28. The rod is then axially rotated until the desired indicator marking 124 is brought into registry with the indicator member 126. The plunger rod is then advanced to engage the pentagonal portion 43 in the pentagonal opening 28 and the device is ready for operation.

The selector dial 112 in addition to providing an easily read indexing means is advantageous in that the index marks 124 are on a considerably larger radius than the edges of the pentagonal portion 43, and hence the tolerance of the pentagonal portion 43 in the pentagonal opening 28 is magnified, permitting more ready alignment of the pentagonal portion 43 with the pentagonal opening 28. Additionally, it has been found that the indicator member 126 which protrudes from the cylindrical surface of the cover member 85a provides a convenient finger grip for use in disassembly of the device.

While the syringe described above is particularly adapted for use in the inoculation of livestock and the like, it is equally well suited for use in the treatment of humans, especially where mass inoculations are to be performed.

While specific embodiments of the invention have been shown and described, the invention is not intended to be limited to the exact details of the constructions set forth, and the invention embraces such changes, modifications and equivalents of the parts and their formation and arrangement as come within the purview of the appended claims.

I claim:

1. In a hypodermic syringe, the combination of a base member having a polygonal central opening; a reciprocable plunger rod extending through said opening, said rod having a first portion with a polygonal cross-section corresponding to the cross-section of said opening and forming a plurality of longitudinal edges, said first portion cooperating with said opening to permit longitudinal reciprocation of the rod therethrough but preventing axial rotation of said rod therein, and said rod having a second portion of circular cross-section freely axially rotatable in said opening; and a series of spaced abutment means on each of said longitudinal edges, the abutment means in each series being equally spaced apart and the spacing of the abutment means in one series being greater than the spacing of the abutment means in another series.

2. In a hypodermic syringe, the combination of a base member having a polygonal central opening; a reciprocable plunger rod extending through said opening, said rod having a first portion with a polygonal cross-section corresponding to the cross-section of said opening and forming a plurality of longitudinal edges, said first portion cooperating with said opening to permit longitudinal reciprocation of the rod therethrough but preventing axial rotation of said rod therein, and said rod having a second portion of circular cross-section freely axially rotatable in said opening; and a series of spaced abutment means on each of said longitudinal edges, the abutment means in each series being equally spaced apart and the spacing of the abutment means in any one series being different than the spacing of the abutment means in the other series.

3. In a hypodermic syringe, the combination of a base member having a noncircular opening; a plunger; a reciprocable plunger rod extending through said noncircular opening and carrying at its forward end said plunger, the forward portion of said rod being of circular cross-section adapted to be freely axially rotated in said noncircular opening, the remaining portion of said rod being of noncircular cross-section corresponding to the cross-section of said opening to permit longitudinal reciprocation of the rod therethrough but preventing axial rotation of said rod therein; and means for urging the plunger rod in a forward longitudinal direction upon rearward withdrawal of said rod to a point where the forward portion of said rod is within said opening.

4. In a hypodermic syringe, the combination of a base member having a noncircular opening; a plunger; a reciprocable plunger rod extending through said noncircular opening and carrying at its forward end said plunger, the forward portion of said rod being of circular cross-section adapted to be freely axially rotated in said noncircular opening, the remaining portion of said rod being of non-circular cross-section corresponding to the cross-section of said opening to permit longitudinal reciprocation of the rod therethrough but preventing axial rotation of said rod therein; and a spring member interposed between the plunger and the base member adapted to be compressed upon rearward withdrawal of said plunger rod to a point where the forward portion of said rod is within said opening, the spring member at this point being adapted to urge the plunger rod in a forward longitudinal direction.

5. In a hypodermic syringe, the combination of a base member having a polygonal central opening; a reciprocable plunger rod extending through said opening, said rod having a first portion with a polygonal cross-section corresponding to the cross-section of said opening and forming a plurality of longitudinal edges, said first portion cooperating with said opening to permit longitudinal reciprocation of the rod therethrough but preventing axial rotation of said rod therein, and said rod having a second portion of circular cross-section freely axially rotatable in said opening; a series of spaced abutment means on each of said longitudinal edges, the abutment means in each series being equally spaced apart and the spacing of the abutment means in any one series being different from the spacing of the abutment means in any other series; and indexing means carried on said base member for aligning the first portion of said rod in said polygonal opening.

6. In a hypodermic syringe, the combination of a base member having a polygonal central opening; a reciprocable plunger rod extending through said opening, said rod having a first portion with a polygonal cross-section corresponding to the cross-section of said opening and forming a plurality of longitudinal edges, said first portion cooperating with said opening to permit longitudinal reciprocation of the rod therethrough but preventing axial rotation of said rod therein, and said rod having a second portion of circular cross-section freely axially rotatable in said opening; a series of spaced abutment means on each of said longitudinal edges, the abutment means in each series being equally spaced apart and the spacing of the abutment means in one series being greater than the spacing of the abutment means in another series; a radially slidable saddle member carried on said base member, said saddle member having a face portion shaped to conform with a portion of the periphery of the first portion of said rod; and spring means urging said saddle into contact with said first portion.

7. In a hypodermic syringe, the combination of a reciprocable plunger rod, said rod having a plurality of spaced abutment means thereon; and means cooperating with said abutment means for stopping longitudinal movement of said plunger rod and for locking said rod in the stopped position, said means including a latch member, a first means normally urging said latch member into engagement with said abutment means, and a second means automatically operative to urge said latch member out of engagement with said abutment means, said second means being operative to overrule said first means upon disengagement of said latch from said abutment means.

8. In a hypodermic syringe, the combination of a reciprocable plunger rod, said rod having a plurality of spaced abutment means thereon; and means cooperating with said abutment means for stopping longitudinal movement of said plunger rod and for locking said rod in the stopped position, said means including a latch member, first resilient means normally urging said latch member radially into engagement with said abutment means, and second resilient means normally urging said latch member longitudinally of said abutment means, whereby said first resilient means may be prevented from automatically reengaging an abutment means when once disengaged therefrom.

9. In a hypodermic syringe, the combination of a base member having an opening therein; a plunger rod reciprocable in said opening, said rod having a plurality of spaced abutment means thereon; and means cooperating with said abutment means for stopping longitudinal movement of said plunger rod and for locking said rod in the stopped position, said means including a latch member operably mounted on said base member, first resilient means normally urging said latch member radially into engagement with said abutment means, and second resilient means normally urging said latch member longitudinally of said abutment means, to fully disengage said latch therefrom upon radial retraction of said latch member.

10. In a hypodermic syringe, the combination of a base member having an opening therein; a plunger rod reciprocable in said opening, said rod having a plurality of spaced abutment means thereon; and means cooperating with said abutment means for stopping longitudinal movement of said plunger rod and for locking said rod in the stopped position, said means including a latch member operably carried on said base member, first resilient means normally urging said latch member radially into engagement with said abutment means, manually operable means for disengaging said latch member from said abutment means, and second resilient means responsive to longitudinal movement of said rod for preventing immediate reengagement of said latch means with a previously engaged abutment.

11. In a hypodermic syringe, the combination of a base member having a polygonal central opening; a reciprocable plunger rod extending through said opening, said rod having a first portion with a polygonal cross-section corresponding to the cross-section of said opening and forming a plurality of longitudinal edges, said first portion cooperating with said opening to permit longitudinal reciprocation of the rod therethrough but preventing axial rotation of said rod therein, and said rod having a second portion of circular cross-section freely axially rotatable in said opening; a series of spaced abutment means on each of said longitudinal edges, the abutment means in each series being equally spaced apart and the spacing of the abutment means in one series being greater than the spacing of the abutment means in another series; and indexing means carried on said base member for aligning the first portion of said rod in said polygonal opening, said means including a selector dial mounted on said base member for axial rotation with respect thereto, means connecting said selector dial and said plunger rod whereby said selector dial is constrained to rotate therewith and said plunger rod is free to reciprocate longitudinally with respect to said selector dial, and an indicator member fixed on said base member and cooperating with said selector dial to indicate the angular position of said plunger rod with respect to said base member.

12. In a hypodermic syringe, the combination of a base member having a polygonal central opening; a reciprocable plunger rod extending through said opening, said rod having a first portion with a polygonal cross-section corresponding to the cross-section of said opening and forming a plurality of longitudinal edges, said first portion cooperating with said opening to permit longitudinal reciprocation of the rod therethrough but preventing axial rotation of said rod therein, and said rod having a second portion of circular cross-section freely axially rotatable in said opening; a series of spaced abutment means on each of said longitudinal edges, the abutment means in each series being equally spaced apart and the spacing of the abutment means in one series being greater than the spacing of the abutment means in another series; and indexing means carried on siad base member for aligning the first portion of said rod in said polygonal opening, said means including a selector dial mounted on said base member for axial rotation with respect thereto, said selector dial having a polygonal central opening through which the first portion of said plunger rod extends whereby said selector dial is constrained to rotate therewith and said plunger rod is free to reciprocate longitudinally with respect to said selector dial, and an indicator member fixed on said base member and cooperating with said selector dial to indicate the angular position of said plunger rod with respect to said base member.

13. In a hypodermic syringe, the combination of a base member having a polygonal central opening; a reciprocable plunger rod extending through said opening, said rod having a first portion with a polygonal cross-section corresponding to the cross-section of said opening and forming a plurality of longitudinal edges, said first portion cooperating with said opening to permit longitudinal reciprocation of the rod therethrough but preventing axial rotation of said rod therein, and said rod having a second portion of circular cross-section freely axially rotatable in said opening; a series of spaced abutment means on each of said longitudinal edges, the abutment means in each series being equally spaced apart and the spacing of the abutment means in one series being greater than the spacing of the abutment means in another series; a cover member on said base member, said cover member having an end face substantially normal to the axis of the base member and said end face having a central opening therein of larger diameter than said polygonal central opening; and indexing means carried on said base member for aligning the first portion of said rod in said polygonal opening, said means including a selector dial, spring fingers on said dial cooperating with the portion of said cover member adjacent the central opening therein for rotatably mounting said dial on said cover member, said selector dial having a polygonal central opening through which the first portion of said plunger rod extends whereby said selector dial is constrained to rotate therewith and said plunger rod is free to reciprocate longitudinally with respect to said selector dial, and an indicator member fixed on said base member and cooperating with said selector dial to indicate the angular position of said plunger rod with respect to said base member.

References Cited in the file of this patent

UNITED STATES PATENTS

| Number | Name | Date |
|---|---|---|
| 854,399 | Bridge | May 21, 1907 |
| 1,499,662 | Jube | July 1, 1924 |
| 1,737,844 | Heineman et al. | Dec. 3, 1929 |
| 2,409,656 | Austin | Oct. 22, 1946 |
| 2,457,859 | Austin | Jan. 4, 1949 |
| 2,502,639 | Blake | Apr. 4, 1950 |

FOREIGN PATENTS

| Number | Country | Date |
|---|---|---|
| 276,860 | Switzerland | July 31, 1951 |